May 16, 1950     D. SAMIRAN     2,507,545
AUTOMATIC SHUTOFF VALVE FOR FUEL NOZZLES
Filed April 22, 1948
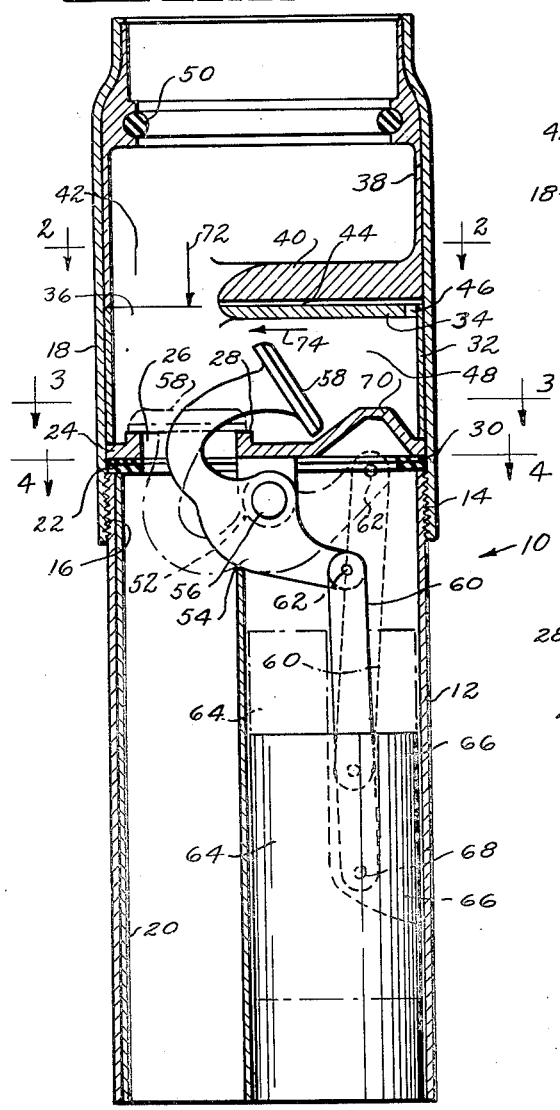
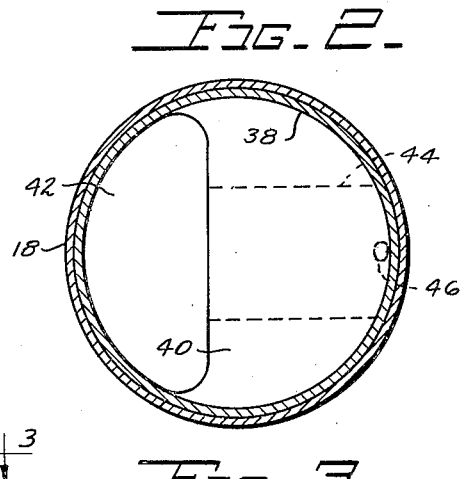
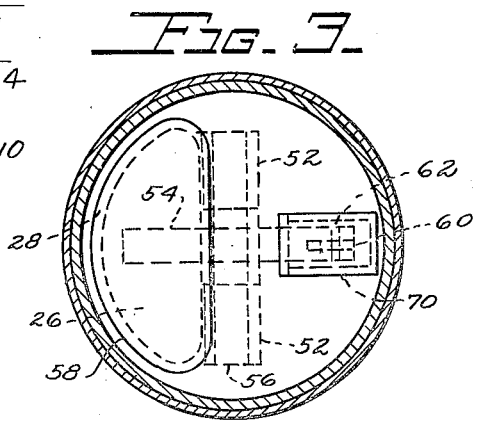
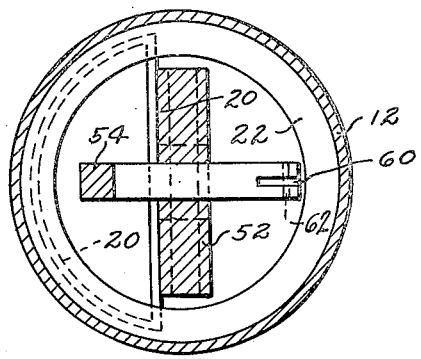
INVENTOR.
DAVID SAMIRAN
BY Wade Koontz AND
Frederick W. Cotterman
ATTORNEYS Patented May 16, 1950

2,507,545

UNITED STATES PATENT OFFICE 2,507,545

AUTOMATIC SHUTOFF VALVE FOR FUEL NOZZLES

David Samiran, Dayton, Ohio

Application April 22, 1948, Serial No. 22,681

3 Claims. (Cl. 137—104)

(Granted under the act of March 3, 1883, as amended April 30, 1928; 370 O. G. 757)

The invention described herein may be manufactured and used by or for the Government for governmental purposes without payment to me of any royalty thereon.

This invention relates to an improved automatic shut-off valve for a fuel nozzle for filling liquid fuel tanks without requiring the attention of an attendant to shut off the flow when the fuel in the tank being filled has reached the desired level.

The invention is an improvement of the valve mechanism in the nozzle shown in Patent No. 2,420,341 of May 13, 1947, to David Samiran and Rudolph Fink, of which I am joint inventor.

An object of the invention is to provide a simple and inexpensive means which will greatly increase the capacity of a nozzle such as is shown in the Samiran and Fink patent, supra.

Other objects and advantages will become evident as the invention is described with reference to the drawing, wherein:

Fig. 1 is a vertical axial section through an automatic shut-off valve similar to that shown in the above-mentioned patent, but including the novel feature which is the subject of the present invention, the valve being shown in the open position, with the closed position shown in phantom.

Figs. 2, 3 and 4 are transverse sections, taken at 2—2, 3—3, and 4—4, of Fig. 1.

Like reference characters refer to like parts throughout the several views.

The automatic valve herein shown is intended for attachment to the delivery side of a fuel nozzle of the type shown in the Samiran and Fink Patent No. 2,420,341, supra, whereby the nozzle is closed when the fluid reaches the required level in the tank being filled.

Referring to the drawings, the valve housing 10 comprises a tubular lower housing part 12, externally threaded at the upper end as at 14 to fit the internal threads 16 of an upper housing part 18.

A D-shaped tubular outflow conduit 20 has a retaining ring 22 welded to its upper end, and this retaining ring fits the inside of the upper housing part 18 and rests directly on the upper edge of the lower housing part 12.

Also fitting the inside of the upper housing part 18 and supported by the conduit retaining ring 22 is a disc-like valve seat member 24. Valve seat member 24 has a D-shaped opening 26 therethrough, a raised rib 28 being formed around the edge of the opening 26 for the valve to rest upon. A relatively thin gasket 30 is interposed between the conduit retaining ring 22 and the valve seat member 24.

A cylindrical spacing member 32 is fitted to the inside of the upper housing part 18 and rests on the valve seat member 24. The upper side of the cylindrical spacing member 32 is partially closed by an integral wall 34 which extends part way only across the top of the member 32, leaving a D-shaped opening 36 substantially aligned with the opening in the D-shaped conduit 20.

A second cylindrical spacing member 38 fits the inside of the upper housing part 18 and rests on the upper edge of the spacing member 32. The lower side of the spacing member 38 is partially closed by an integral wall 40 which extends part way only across the bottom of the member 38, leaving a D-shaped opening 42 aligned with the opening 36. A shallow but relatively wide slot 44 extends across the underside of the wall 40, the slot communicating at the one end with openings 36 and 42, the other end of the slot being connected by a small hole 46 with the chamber 48. Screwing down the upper housing part 18 over the lower housing part 12 by means of threads 14 and 16, both locates and clamps together the several members 20, 22, 24, 30, 32 and 38. A seal ring 50 held in a groove cut in the inside of the spacing member 38 near the upper end thereof facilitates making proper connection of the valve housing 10 to a fuel nozzle.

Depending from the underside of the valve seat member 24 are two spaced apart ears 52 between which the valve closing lever 54 is pivotally supported by the hinge pin 56. The lever 54 is a lever of the first class wherein the pin 56 is the fulcrum, the valve head 58 is at the load end, and a link 60 is hinged to the power end by a pin 62, a float 64 of D-shaped cross section is slotted at 66 to receive the lower end of the link 60. A pin 68 hingedly connects the lower end of the link to the float 64. The valve seat member 24 is deformed upward at 70 to clear the upper end of the link 60 when the valve is in the closed position.

The novelty in the herein disclosed automatic shut-off valve over existing art lies in the provision of suction means which will draw the valve toward open position. In the automatic shut-off valve Patent No. 2,420,341, supra, it was intended that the valve should remain open until the level of the fluid in the tank being filled raised the float and closed the valve. It was found, however, that even when fluid was passed through the valve in the direction of the arrow 72 at a speed considerably below that desired, a suction was created in the direction of the arrow 74 sufficient to move the valve head 58 into the stream of incoming fluid, whereby valve closing depended on the suction indicated by the arrow 74 which depended on the speed of the fluid moving in the direction of the arrow 72, rather than on the height of the fluid rising around the float 64.

In the present invention, the fluid passing in the direction of the arrow 72 past the end of the slot 44, creates a partial vacuum in the chamber 48, which tends to hold the valve from closing. Therefore the greater the speed of the incoming fluid, the the greater is the valve closing force 74, but at the same time the greater is the valve opening force of the partial vacuum in the chamber 48. At any speed therefore the closing of the valve depends on the rise of fluid around the float and not on the speed of the incoming fluid. In this way the capacity of a valve such as is shown in Patent No. 2,420,341, supra, is approximately tripled.

Having described my invention, I claim:

1. An automatic shut-off valve comprising an elongated valve housing having an inflow opening in the top and an outflow opening in the bottom, a lower transverse partition in said housing positioned intermediate the inflow and outflow openings, an upper transverse partition in said housing spaced apart from said lower transverse partition, a valve seat opening in the lower partition, a port of a shape similar to that of the valve seat opening in the upper partition substantially aligned with the valve seat opening, a longitudinal partition in said housing separating the space below said lower partition into a flow passageway and a float chamber, the flow passageway being of substantially the contour of the valve seat opening and substantially aligned therewith, a lever of the first class hinged to the lower partition off to one side of said valve seat opening, a valve head carried on one arm of said lever and positioned to cover said valve seat opening to close said valve when said lever is swung on its hinge in one direction and positioned between said upper and lower partitions and out of the flow stream between the valve seat opening and the port when said lever is swung on its hinge in the other direction, a float in said float chamber, a link connecting said float to the other arm of said lever, said float being heavier than said valve head, whereby when the float descends by force of gravity the valve head is swung to the open position between said transverse partitions and out of the said flow stream between the said valve seat opening and the said port, and a suction channel entering the upper partition at the inner edge of said port and extending horizontally through said partition then downward and into the space between the upper and lower partitions at a point near the outer wall of said housing, whereby the flow stream acting through the space between said valve head and said upper partition tends to close said valve, and acting through said channel tends to hold said valve open, whereby said valve remains open until acted upon by said float.

2. An automatic shut-off valve comprising a cylindrical valve housing open at the top and bottom, a lower transverse partition in said housing positioned intermediate the top and bottom, an upper transverse partition in said housing spaced apart from said lower transverse partition, a valve seat opening off to one side in the lower partition, a port of a contour like that of the valve seat opening in the upper partition substantially aligned with the valve seat opening, a longitudinal partition in said housing separating the space below said lower partition into a flow passageway and a float chamber, the flow passageway being of substantially the contour of the valve seat opening and substantially aligned therewith, a lever of the first class hinged to the underside of the lower partition off to one side of said valve seat opening, a valve head above said lower partition carried on one arm of said lever and positioned to cover said valve seat opening to close said valve when said lever is swung on its hinge in one direction and positioned between said upper and lower partitions and out of the flow stream between the valve seat opening and the port when said lever is swung on its hinge in the other direction, a float in said float chamber, a link connecting said float to the other arm of said lever, said float being heavier than said valve head when both are in air, whereby when the float descends by force of gravity the valve head is swung to the open position between said transverse partitions and out of alignment with said valve seat opening and said port, and a suction channel entering the upper partition at the inner edge of said port and extending horizontally through said partition then downward into the space between the upper and lower partitions at a point near the outer wall of said housing, whereby the flow stream acting through the space between said valve head and said upper partition tends to close said valve, and acting through said channel tends to hold said valve open, whereby said valve remains open until acted upon by said float.

3. An automatic shut-off valve comprising a cylindrical valve housing open at the top and bottom, a lower transverse partition in said housing positioned intermediate the top and bottom, an upper transverse partition in said housing spaced apart from said lower transverse partition, a D-shaped valve seat opening in the lower partition, a D-shaped port in the upper partition substantially aligned with the valve seat opening, a longitudinal partition in said housing separating the space below said lower partition into a D-shaped flow passageway and a D-shaped float chamber, the flow passageway being of substantially the contour of the valve seat opening and substantially aligned therewith, hinge ears on the underside of the lower partition off to one side of said valve seat opening, a lever of the first class hinged to said ears, said lever being curved upwardly through said valve seat opening, a valve head carried on the curved arm of said lever and positioned to cover said valve seat opening to close said valve when said lever is swung on its hinge in one direction and positioned between said upper and lower partitions and out of the flow stream between the valve seat opening and the port when said lever is swung on its hinge in the other direction, a D-shaped float in said float chamber, a link connecting said float to the other arm of said lever, said float being heavier than said valve head when both are in air, whereby when the float descends by force of gravity the valve head is swung to the position between said transverse partitions and completely out of alignment with said valve seat opening and said port, and a suction channel entering the upper partition at that edge of the port which is nearest the axis of the housing and extending horizontally through said partition then downward and into the space between the upper and lower partitions at a point near the outer wall of said housing, whereby the flow stream acting through the space between said valve head and said upper partition tends to close said valve, and acting through said channel tends to hold said valve open, whereby said valve remains open until acted upon by said float.

DAVID SAMIRAN.

REFERENCES CITED

The following references are of record in the file of this patent:

UNITED STATES PATENTS

| Number | Name | Date |
|---|---|---|
| 1,906,277 | McGee | May 2, 1933 |
| 2,420,341 | Samiran | May 13, 1947 |